United States Patent
Iwata et al.

(10) Patent No.: US 11,416,153 B2
(45) Date of Patent: Aug. 16, 2022

(54) MEMORY SYSTEM AND INFORMATION PROCESSING APPARATUS

(71) Applicant: KIOXIA CORPORATION, Tokyo (JP)

(72) Inventors: Tetsuya Iwata, Kanagawa (JP); Hiroya Shirakura, Kanagawa (JP); Shinya Takeda, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/010,772

(22) Filed: Sep. 2, 2020

(65) Prior Publication Data

US 2021/0294509 A1 Sep. 23, 2021

(30) Foreign Application Priority Data

Mar. 23, 2020 (JP) .............................. JP2020-051616

(51) Int. Cl.
*G06F 3/06* (2006.01)

(52) U.S. Cl.
CPC .......... *G06F 3/0634* (2013.01); *G06F 3/0625* (2013.01); *G06F 3/0659* (2013.01); *G06F 3/0679* (2013.01)

(58) Field of Classification Search
CPC .......... G06F 3/06–0689; G06F 3/0634; G06F 3/0625; G06F 3/0659; G06F 3/0679
See application file for complete search history.

(56) References Cited

U.S. PATENT DOCUMENTS

| 2006/0123259 | A1* | 6/2006 | Yokota | .................. | G11B 19/02 |
| | | | | | 713/320 |
| 2014/0281458 | A1 | 9/2014 | Ravimohan et al. | | |
| 2016/0027492 | A1 | 1/2016 | Byun et al. | | |
| 2017/0060477 | A1* | 3/2017 | Kodera | ............... | G06F 11/1052 |

FOREIGN PATENT DOCUMENTS

JP   2007-105913 A   4/2007

* cited by examiner

*Primary Examiner* — Nicholas J Simonetti
(74) *Attorney, Agent, or Firm* — Kim & Stewart LLP

(57) ABSTRACT

A memory system of an embodiment includes a non-volatile memory and a controller configured to control the accessing of the non-volatile memory according to commands from a host device. The controller is configured to set a mode transition time to a value according to a first command received from the host. The controller transitions from a first operating mode to a second operating mode, in which power supply is suspended to a predetermined circuit, when the time since the last command was received from the host device reaches the mode transition time. The controller maintains the second operating mode until another command is received from the host device.

15 Claims, 12 Drawing Sheets

FIG. 5

| Address | Bit 7 | 6 | 5 | 4 | 3 | 2 | 1 | 0 |
|---|---|---|---|---|---|---|---|---|
| A0h | | | | | | | | |
| B0h | | | | | | | | |
| C0h | | | | | | | | |
| 10h | | | | | | | BL1 | BL0 |
| 20h | | | | | | | | |
| 30h | | | | | | | | |
| 40h | | | | | | | | |
| 50h | | | | | | | | |

| BL1 | BL0 | TRANSITION START TIME FOR SECOND MODE |
|---|---|---|
| 0 | 1 | 100us |
| 1 | 0 | 1ms |
| 1 | 1 | 10ms |
| 0 | 0 | 100ms |

MEMORY SYSTEM AND INFORMATION PROCESSING APPARATUS

CROSS-REFERENCE TO RELATED APPLICATION(S)

This application is based upon and claims the benefit of priority from Japanese Patent Application No. 2020-051616, filed on Mar. 23, 2020, the entire contents of which are incorporated herein by reference.

FIELD

Embodiments described herein relate generally to a memory system and an information processing apparatus.

BACKGROUND

As a memory system a NAND type flash memory that utilizes a serial interface protocol, such as the serial peripheral interface (SPI), is known. Such a NAND type flash memory operates in a normal mode, in which data is immediately readable and writable, and a standby mode, in which power consumption is lower than in the normal mode, but data is not immediately readable or writable.

BRIEF DESCRIPTION OF THE DRAWINGS

FIG. 5 is a diagram illustrating various setting information stored in a feature register.

FIG. 6 is a diagram illustrating a relationship between numerical values set in a predetermined area of the feature register and a transition start time to a second mode.

DETAILED DESCRIPTION

Figure 1:
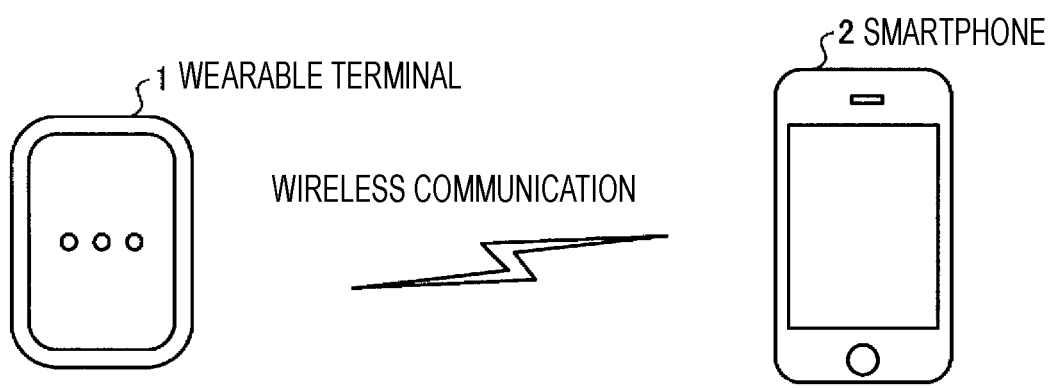
FIG. 1 is a schematic diagram illustrating devices using a memory system according to a first embodiment.

Embodiments provide a highly flexible memory system and an information processing apparatus.

In general, according to one embodiment, a memory system, which may be installed in or connected to a host device, includes a non-volatile memory and a controller configured to control accessing of the non-volatile memory according to commands from a host device. The controller is configured to set a mode transition time to a value according to a first command received from the host device. The controller is also configured to transition from a first operating mode to a second operating mode when the time since any command was last received from the host reaches the set mode transition time. In the second operating mode power supply is suspended to a predetermined circuit. The controller is configured to maintain the second operating mode until a second command is received from the host device.

First Embodiment

A memory system according to a first embodiment is a NAND type flash memory that conforms to a serial interface (e.g., SPI). A SPI-compliant memory system may be incorporated into various information devices, such as industrial devices, medical devices, and household devices. The memory system may be incorporated into a home electric appliance that may directly use a commercial power source, or a wearable terminal or a mobile device that is driven by battery power.

The memory system has a standby mode in which power consumption may be reduced even though the power is on. In the standby mode, the operation of certain circuits of the controller of the memory system is suspended. This makes it possible to reduce the operating current as compared with the operating current in the normal mode. By utilizing the standby mode, the power consumption of the memory system can be reduced. In the normal mode, basic operations, such as data writing, data reading, and data erasing, can be executed according to an instruction from a host device. The normal mode is sometimes referred to as a first mode, and the standby mode is sometimes referred to as a second mode.

When the memory system is in the standby mode, it is not possible to immediately execute a command that requires starting a circuit whose power supply has been suspended for the standby mode (hereinafter, referred to as a standby start required command). Power supply to various circuits may be suspended in the standby mode, for example, a NAND interface circuit 230, a NAND input/output circuit 240, a sequencer (state machine) 250, a data buffer 260, and a counter circuit 290 may be suspended. When receiving an access command from the host, the memory system in the standby mode needs to return to the normal mode by resuming the power supply to the blocks whose power supply has been suspended. As a result, a response is delayed as compared with a case where the standby start required command is received in the normal mode.

As described above, the memory system conforming to the SPI may be incorporated into various devices. The devices to be incorporated include both device types for which it is desired to aggressively use the standby mode in order to reduce power consumption as much as possible, and those for which reduction in response times is prioritized over power consumption. That is, there are various possible demands regarding power consumption control for memory systems depending on device type and application. In the related art, since a manufacturer of memory systems must manufacture memory systems all the different possible device types for which the setting of the power consumption control are often different for each device type, the burden to meet the various possible demands is large.

Therefore, the memory system of the present embodiment is configured so that the timing for the transition to the standby mode may be set (adjusted) by a specific command. Specifically, the memory system of the present embodiment is configured so that the transition start time for the second mode (that is, how long of a wait before starting the transition to the second mode) may be set by a specific command. As a result, whenever the elapsed time since receipt of the last command reaches the set transition start time, the memory system transitions from the normal mode to the standby mode (second mode).

That is, the memory system is configured so that a threshold value used for determining the timing of transition to the standby mode can be set by a command from the device in which the memory system is to be incorporated (e.g., a host device or the like).

Therefore, the manufacturer of the memory system can be relieved of the burden of changing the transition time settings for each customer who incorporates a memory system into a device. Further, the device in which the memory system is to be incorporated may be operated such that the threshold value used for determining the timing of transition to the standby mode can be changed according to the situation/context. That is, it is possible to implement a memory system that is more convenient than that of the related art.

Hereinafter, descriptions will be made for a memory system incorporated into a wearable terminal, as an example. The wearable terminal is driven by battery power and is therefore required to reduce power consumption when possible. A memory system according to embodiments will be described in detail with reference to the accompanying drawings. The present disclosure is not limited to these example embodiments.

FIG. 1 is a schematic diagram illustrating a wearable terminal 1 including a memory system according to a first embodiment and a smartphone 2 used in pair with the wearable terminal 1. As illustrated, the wearable terminal 1 and the smartphone 2 make up a computing system. The wearable terminal 1 is an example of an information processing apparatus. The wearable terminal 1 and the smartphone 2 are configured to communicate with each other by wireless communication. The wireless communication may be performed in accordance with any standard, e.g., Bluetooth (registered trademark) low energy.

The wearable terminal 1 is worn by a user and can measure, for example, the speed, position, acceleration, temperature, and the heartbeat of the user by a position sensor, an acceleration sensor, a temperature sensor, and a heartbeat sensor in a sensor unit 16 (to be described later). The wearable terminal 1 transmits information (hereinafter sometimes referred to the sensor information) measured by the sensor unit 16 to the smartphone 2 at a particular timing.

The smartphone 2 notifies the user by displaying the sensor information received from the wearable terminal 1 on, for example, a display. The user can know his or her own behavior by referring to this notification. A transmission destination of the sensor information is not limited to the smartphone 2 of the user, and may be transmitted to another device.

Figure 2:
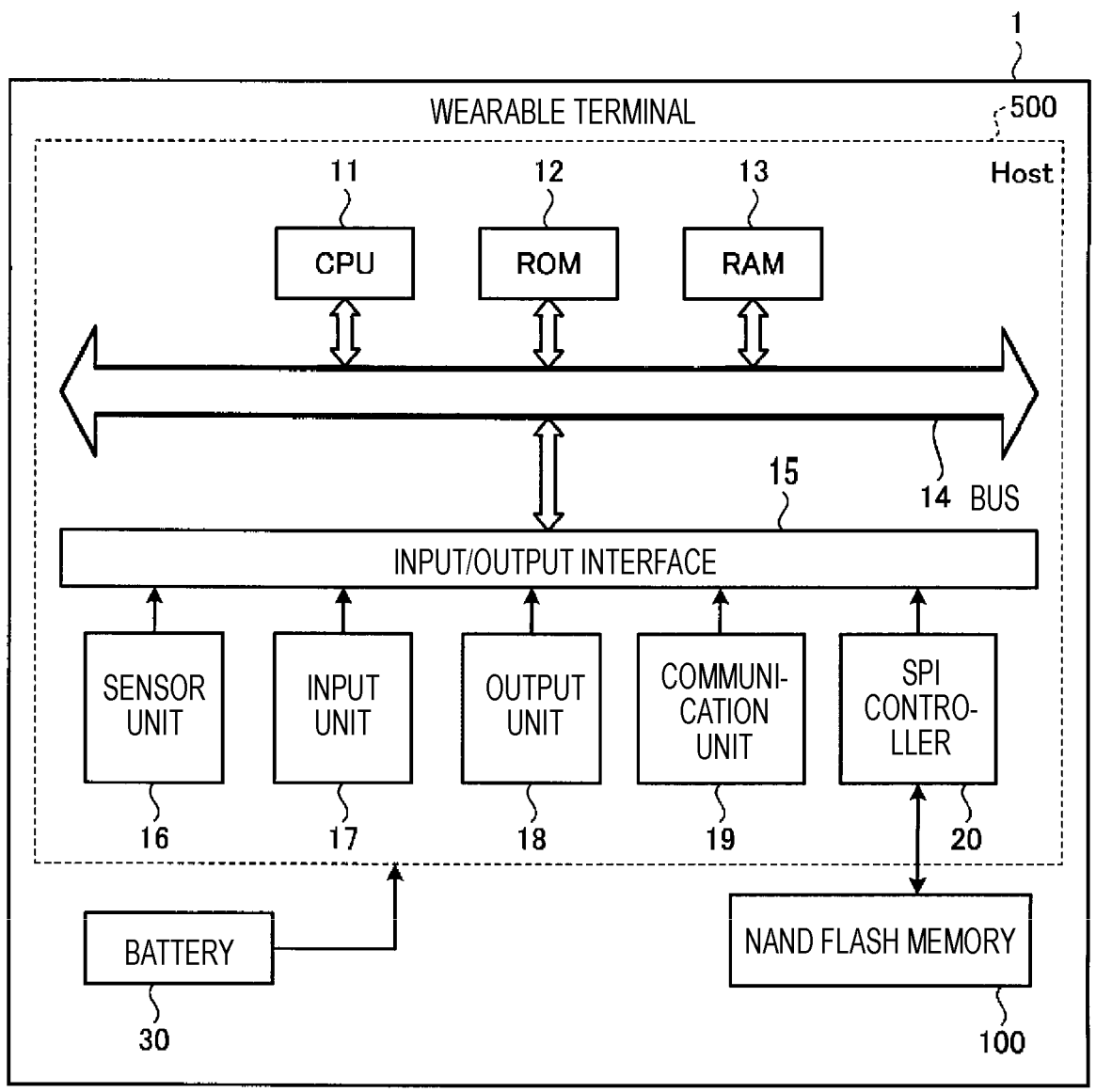
FIG. 2 is a schematic hardware diagram illustrating a wearable terminal.

FIG. 2 is a schematic hardware diagram illustrating the wearable terminal 1.

The wearable terminal 1 includes a central processing unit (CPU) 11, a read only memory (ROM) 12, a random access memory (RAM) 13, a bus 14, an input/output interface 15, the sensor unit 16, an input unit 17, an output unit 18, a communication unit 19, an SPI controller 20, and a battery 30. A NAND type flash memory 100 conforming to SPI is connected to the SPI controller 20.

The battery 30 supplies electric power to the CPU 11, the ROM 12, the RAM 13, the bus 14, the input/output interface 15, the sensor unit 16, the input unit 17, the output unit 18, and the communication unit 19. The SPI-compliant NAND type flash memory 100 is supplied with power via the SPI controller 20.

The CPU 11 executes various processes according to a program(s) recorded in the ROM 12 or a program(s) loaded into the RAM 13 from the SPI-compliant NAND type flash memory 100 via the input/output interface 15 and the bus 14.

The RAM 13 provides an area for loading a program(s) to be executed by the CPU 11 and an area for caching or buffering data.

The CPU 11, the ROM 12, and the RAM 13 are connected to each other via the bus 14. The input/output interface 15 is also connected to the bus 14. The sensor unit 16, the input unit 17, the output unit 18, and the communication unit 19 are connected to the input/output interface 15.

The sensor unit 16 generates sensor information at a predetermined time cycle. The sensor unit 16 is, for example, an acceleration sensor, a heartbeat sensor, a temperature sensor, a respiration sensor, or a positioning sensor. The sensor information is stored in the SPI-compliant NAND type flash memory 100 via the input/output interface 15.

The input unit 17 is composed of one or more buttons. Instructions from the user are input via the input unit 17. The output unit 18 includes a lamp, a display, a speaker, and/or a vibration motor, and outputs an image, a sound, and/or a vibration signal. Further, the functions of the input unit 17 and the output unit 18 may be integrally provided by a touch panel.

The communication unit 19 controls communication performed with the smartphone 2 by wireless communication complying with standards such as Bluetooth (registered trademark) low energy.

The SPI controller 20 may transmit an access command according to the instruction from the CPU 11.

The SPI-compliant NAND type flash memory 100 is an SPI-compliant non-volatile memory system. The CPU 11, the ROM 12, the RAM 13, the bus 14, the input/output interface 15, the sensor unit 16, the input unit 17, the output unit 18, and the communication unit 19 function as a host device (hereinafter referred to as the host or the host controller) 500 that transmits various commands to the SPI-compliant NAND type flash memory 100. The host 500 operates as a master, and the NAND type flash memory 100 operates as a slave.

The SPI-compliant NAND type flash memory 100 operates in the normal mode and the standby mode, which consumes less power than the normal mode. In the normal mode, the SPI-compliant NAND type flash memory 100 can execute a command from the host 500. In the standby mode, the SPI-compliant NAND type flash memory 100 cannot immediately execute the command from the host 500. When receiving an access command from the host 500, the SPI-compliant NAND type flash memory 100 in the standby mode transitions to the normal mode and executes the access command in the normal mode.

The SPI-compliant NAND type flash memory 100 transitions from the normal mode to the standby mode when the elapsed time since the last command is received reaches the preset transition start time to the second mode (the standby mode).

Here, as described above, the host 500 may set the start time (wait time) for the transition from the normal mode to the standby mode (the second mode) in the NAND type flash memory 100 by a specific command.

The specific command is one of SPI-compliant set feature commands. However, without being limited thereto, in other examples, a new command that does not comply with SPI may be used. In the following, it is assumed that the SPI-compliant NAND type flash memory 100 sets the transition start time for the second mode by a set feature command. The set feature command is a command for setting (changing) various setting parameters in the SPI-compliant NAND type flash memory 100. That is, the transition start time can be considered as one of the parameters (values) that may be set in the SPI-compliant NAND type flash memory 100.

Figure 3:
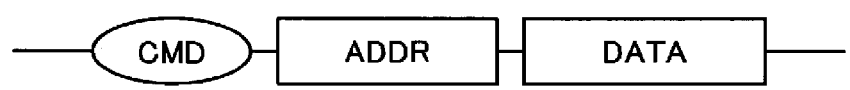
FIG. 3 is a schematic diagram illustrating a command sent to a NAND type flash memory.

FIG. 3 is a schematic diagram illustrating a command sent to the SPI-compliant NAND type flash memory 100. As illustrated, the command is typically sent from the host 500 to the SPI-compliant NAND type flash memory 100 at the head of the command sequence including a command CMD, address information ADDR, and data DATA. Depending on the type of the command CMD, there may be no address information ADDR, data DATA, or both.

For example, in the case of a read command for reading data from the SPI-compliant NAND type flash memory 100, as the command CMD, a value meaning the read command is sent from the host 500 to the SPI-compliant NAND type flash memory 100, and as the address information ADDR, an address where the data to be read is stored is sent, and no data DATA is sent.

In the case of a write command for writing data from the host 500 to the SPI-compliant NAND type flash memory 100, as the command CMD, a value meaning the write command is sent from the host 500 to the SPI-compliant NAND type flash memory 100, as the address information ADDR, an address where write data is to be written is sent, and the write data is sent as the data DATA.

In the case of the set feature command, as the command CMD, a value corresponding to the set feature command is sent from the host 500 to the SPI-compliant NAND type flash memory 100, as the address information ADDR is sent, an address indicating the position where desired setting information is stored in a feature register 280, and the setting information is sent as the data DATA. The setting information regarding the transition start time to the second mode is sent as the data DATA, and the address where the setting information regarding the transition start time to the second mode is stored in the feature register 280 is sent as the address information ADDR.

Figure 4:
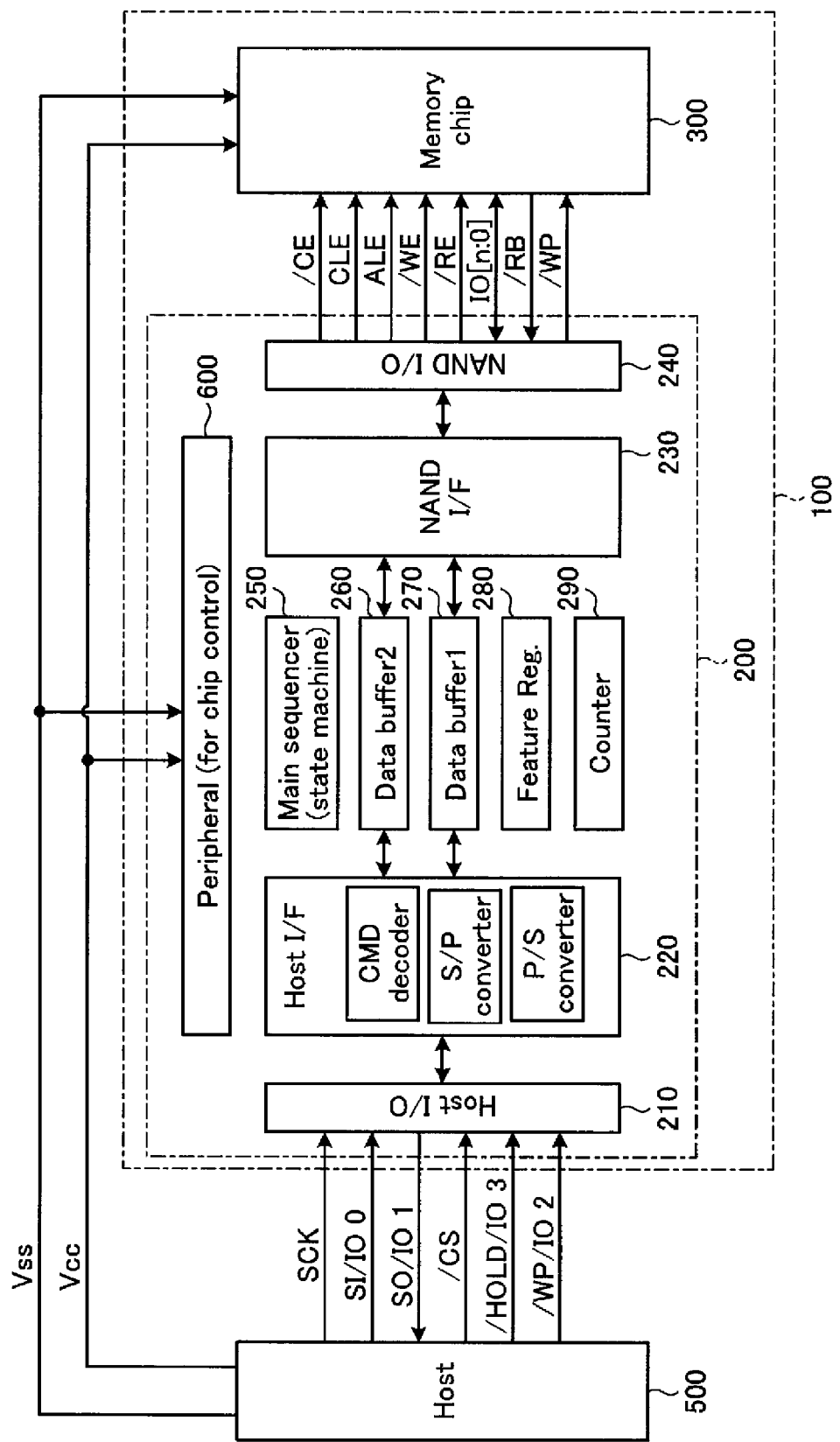
FIG. 4 is a schematic hardware diagram illustrating the NAND type flash memory.

FIG. 4 is a schematic hardware diagram illustrating the SPI-compliant NAND type flash memory 100.

The SPI-compliant NAND type flash memory 100 includes a controller 200 and a memory chip 300. The memory chip 300 includes a plurality of memory cells and stores data in a non-volatile manner. The controller 200 is connected to the memory chip 300 by a NAND bus, and is connected to the input/output interface 15 of the host 500 by an SPI bus. The controller 200 controls the memory chip 300.

The SPI bus conveys, for example, a clock signal SCK, a serial data input signal SI/IO 0, a serial data output signal SO/IO 1, a chip enable signal /CS, a control signal /HOLD/IO 3, and a write protect signal /WP/IO 2.

The SPI-compliant NAND type flash memory 100 is further supplied with a ground voltage Vss and a power supply voltage Vcc from the host 500.

The NAND bus conveys signals transmitted from or to a NAND interface. For example, the NAND bus conveys a chip enable signal /CE, an address latch enable signal ALE, a command latch enable signal CLE, a write enable signal /WE, a read enable signal /RE, a ready/busy signal /RY/BY, an input/output signal I/O, and a write protect signal /WP.

The controller 200 includes a host input/output circuit 210, a host interface circuit 220, a NAND interface circuit 230, a NAND input/output circuit 240, a sequencer 250, data buffers 260 and 270, the feature register 280, a counter circuit 290, and a peripheral circuit 600.

The host input/output circuit 210 functions as a buffer for signals transmitted to and received from the host 500. The signals SCK, SI/IO 0, /CS, /HOLD/IO 3, and /WP/IO 2 are first received by the host input/output circuit 210 and then output to the host interface circuit 220.

The host interface circuit 220 acquires the signal SI/IO 0 transmitted from the host 500 to the SPI-compliant NAND type flash memory 100 in synchronization with the signal SCK. Further, the host interface circuit 220 transmits the signal SO/IO 1 output to the SPI-compliant NAND type flash memory 100 in synchronization with the signal SCK to the host 500 via the host input/output circuit 210.

The host interface circuit 220 controls transmission/reception of signals to/from the host 500 via the host input/output circuit 210. The host interface circuit 220 also functions as a serial-to-parallel converter (S/P converter) and a parallel-to-serial converter (P/S converter). For example, the serial data input signal SI/IO 0 from the host 500 is converted from a serial signal to a parallel signal, and the data read from the memory chip 300 is converted from a parallel signal to a serial signal. Further, the host interface circuit 220 functions as a command decoder when the serial data input signal SI/IO 0 is a command, and decodes the received command. Then, the decoding result is output to, for example, the sequencer circuit 250.

The data buffer 270 temporarily stores the write data received from the host 500 via the host interface circuit 220. Further, the data buffer 260 temporarily stores the data read from the memory chip 300 via the NAND interface circuit 230.

The feature register 280 stores various setting information regarding the SPI-compliant NAND type flash memory 100. The feature register 280 stores, for example, setting information regarding the second mode transition start time at which the transition to the standby mode is performed.

The NAND interface circuit 230 controls transmission/reception of signals to/from the memory chip 300 via the NAND input/output circuit 240. Then, the NAND interface circuit 230 outputs various commands conforming to the NAND interface to the memory chip 300 via the NAND input/output circuit 240 along with the address in the address register according to the instruction of the sequencer circuit 250.

When writing data to the memory chip 300, the NAND interface circuit 230 outputs the data in the data buffer 260 and/or 270 to the memory chip 300 via the NAND input/output circuit 240 after issuing the command and the address. Further, when reading data from the memory chip 300, the NAND interface circuit 230 transfers the data read from the memory chip 300 to the data buffer 260 and/or 270.

The NAND input/output circuit 240 functions as a buffer for signals transmitted/received to/from the memory chip 300. Further, the signals /CE, CLE, ALE, /WE, /RE, and /WP are asserted or deasserted according to the instruction of the NAND interface circuit 230. Furthermore, when reading data from the memory chip 300, the signal IO (read data) is temporarily stored and transferred to the NAND interface circuit 230, and when writing to the memory chip 300, the signal IO (write data) is temporarily stored and transmitted to the memory chip 300. Also, a ready/busy signal /RY/BY is received from the memory chip 300 and transferred to the NAND interface circuit 230.

The peripheral circuit 600 supplies the power supply voltage Vcc and the ground voltage Vss to each circuit, and performs a control necessary for the operation of the controller 200.

The sequencer circuit 250 controls the entire operation of the controller 200. For example, when a read command is sent from the host 500, the NAND interface circuit 230 is instructed to execute a sequence for executing the read operation. When a write command is sent from the host 500, the NAND interface circuit 230 is instructed to execute a sequence for executing the write operation.

Further, when the set feature command is sent from the host 500, the sequencer circuit 250 writes the setting information sent as the data DATA to the address designated by the address information ADDR in the feature register 280. The sequencer circuit 250 controls the controller 200 according to the setting information stored in the feature register 280.

As described above, the feature register 280 may store a setting value or other information corresponding to the transition start time for the second mode. As a stored setting value the value equal to the transition start time itself may be used, or other numerical information associated or associable with a time length or value for the transition start time may be used.

In an example, different numerical values can be assigned (coded) to indicate "100 µs", "1 ms", "10 ms", "100 ms", "1 s", and "do not transition to a standby mode." The numerical value assigned to any of these can be stored in the feature register 280 as setting information for the transition start time to the second mode. When the setting information stored in the feature register 280 indicates "100 µs", "1 ms", "10 ms", "100 ms", or "1 s", the sequencer circuit 250 uses the setting information to transition to the standby mode.

Specifically, the sequencer circuit 250 resets a counter of the counter circuit 290 and starts counting, for example, every time a command is received. The counter circuit 290 counts, for example, the number of times the signal SCK is toggled after the start. The sequencer circuit 250 acquires the elapsed time after receiving the last command based on the count value of the counter circuit 290, and transitions to the standby mode when the elapsed time reaches the threshold value. Further, a method of counting the time elapsed since the last command is received is not limited thereto.

When the setting information stored in the feature register 280 indicates "do not transition to a standby mode", the sequencer circuit 250 does not start counting by the counter circuit 290 and does not transition to standby mode. Therefore, the controller 200 continues to operate in the normal mode.

The sequencer circuit 250 stops the operation of one or more predetermined circuits in the standby mode. Any circuits other than the circuits necessary for receiving and interpreting the command from the host 500 are the targets of suspending the operation. In other words, the SPI-compliant NAND type flash memory 100 may receive a command from the host 500 and interpret the command even in the standby mode. For example, the NAND interface circuit 230 and the NAND input/output circuit 240 are set to suspend operation in the standby mode. These circuits are circuits necessary for accessing the memory chip 300, but not required for receiving and interpreting commands from the host 500.

Any method may be used to suspend the operation. For example, the sequencer circuit 250 suspends the supply of the clock signal to the targets of suspending the operation, or suspends the supply of the power to the targets. By suspending the operation of the predetermined circuits, the current in the standby mode is reduced as compared with the operating current in the normal mode.

In the standby mode, the SPI-compliant NAND type flash memory 100 cannot execute the operation using the suspended circuits. Therefore, the SPI-compliant NAND type flash memory 100 in the standby mode can receive and interpret a command, but cannot execute the command. In the SPI-compliant NAND type flash memory 100 in the standby mode, when the command is received, the sequencer circuit 250 changes the operation mode of the controller 200 from the standby mode to the normal mode, and executes the operation of the command received in the normal mode. When transitioning from the standby mode to the normal mode, the sequencer circuit 250 resumes power supply to the NAND interface circuit 230 and the NAND input/output circuit 240, and then the controller 200 starts operation in the normal mode.

FIG. 5 is a diagram illustrating various setting information stored in the feature register 280. According to the example illustrated, the feature register 280 includes eight registers each having a size of 1 byte (=8 bits), and each of the eight registers is identified by eight address values of A0h, B0h, C0h, 10h, 20h, 30h, 40h, and 50h (referred to as feature table addresses). Each of the eight registers stores setting information in bit units.

The setting information of the transition start time is stored in a 2-bit area 700 on a Least Significant Bit (LSB) side of the register specified by, for example, the address value 10h. The LSB of the area 700 is represented as BL0, and the other bits are represented as BL1.

FIG. 6 is a diagram illustrating a relationship between numerical values set in the area 700 and the transition start time for the second mode. Here, the value x of BL1 and the value y of BL2 are expressed as "xy". According to the example of FIG. 6, "01" corresponds to "100 µs", "10" corresponds to "1 ms", "11" corresponds to "10 ms", and "00" corresponds to "100 ms".

The relationship illustrated in FIG. 6 is merely an example. The relationship between the numerical values set in the area 700 and the transition start time to the second mode is not limited to the above. For example, a 3-bit area in the feature register 280 can be allocated to an area in which the transition start time to the second mode is set. Depending on the 3-bit area, a numerical value associated with any of "100 µs", "1 ms", "10 ms", "100 ms", "1 s", and "do not transition to standby mode" may be stored.

In addition, the area in which the transition start time related values are stored is not limited to the area 700.

Figure 7:
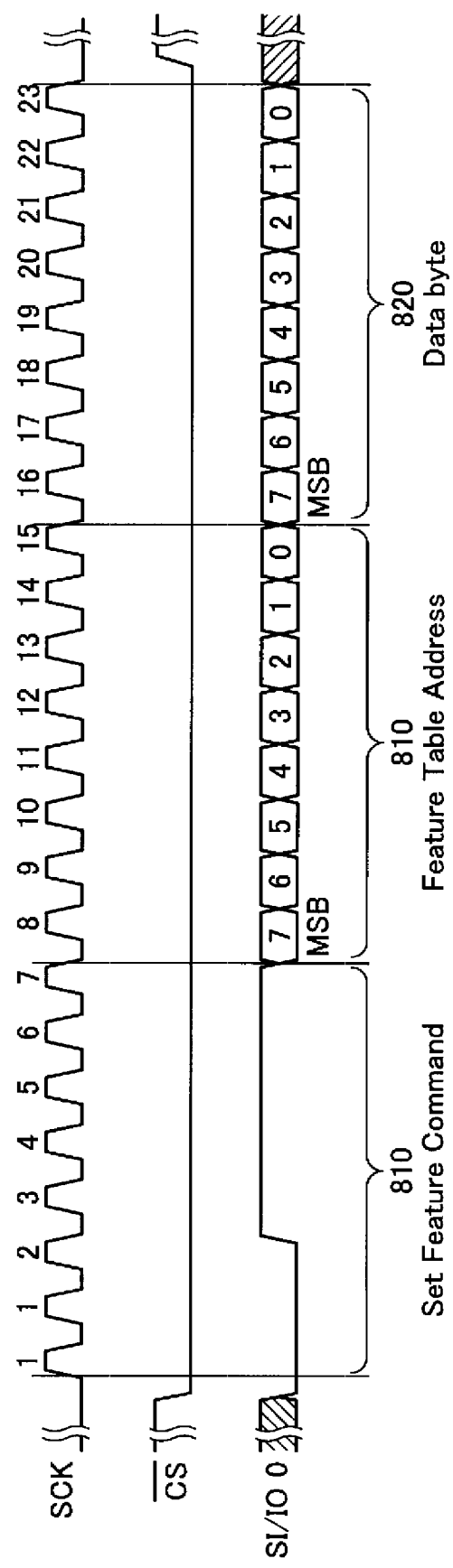
FIG. 7 is a diagram illustrating a command sequence of a set feature command for setting the transition start time for the second mode.

FIG. 7 is a diagram illustrating the command sequence of the set feature command for setting the transition start time to the second mode. In FIG. 7, the states of the signal SCK, the signal /CS, and the signal SI/IO 0 are illustrated. The command CMD, the address information ADDR, and the data DATA are transmitted during the period in which the signal /CS is the low level.

In the command sequence of the set feature command, a set feature command 810 is transmitted as the command CMD. Following the set feature command 810, a feature table address 810 is transmitted as address information ADDR. According to the arrangement example illustrated in FIG. 5, the address value 10h is transmitted as the feature table address 810. Then, any of the four numerical values defined by FIG. 6 can be included as 2-bit information consisting of the LSB (i.e., BL0) and the bit immediately preceding the LSB (i.e., BL1) among data byte 820, which is 1-byte (8-bit) information stored in the register identified by the address value 10h, is transmitted as the data DATA.

Further, the command sequence of the set feature command illustrated in FIG. 7 is an example. The command sequence of the set feature command may be different from the example illustrated in FIG. 7.

Figure 8:
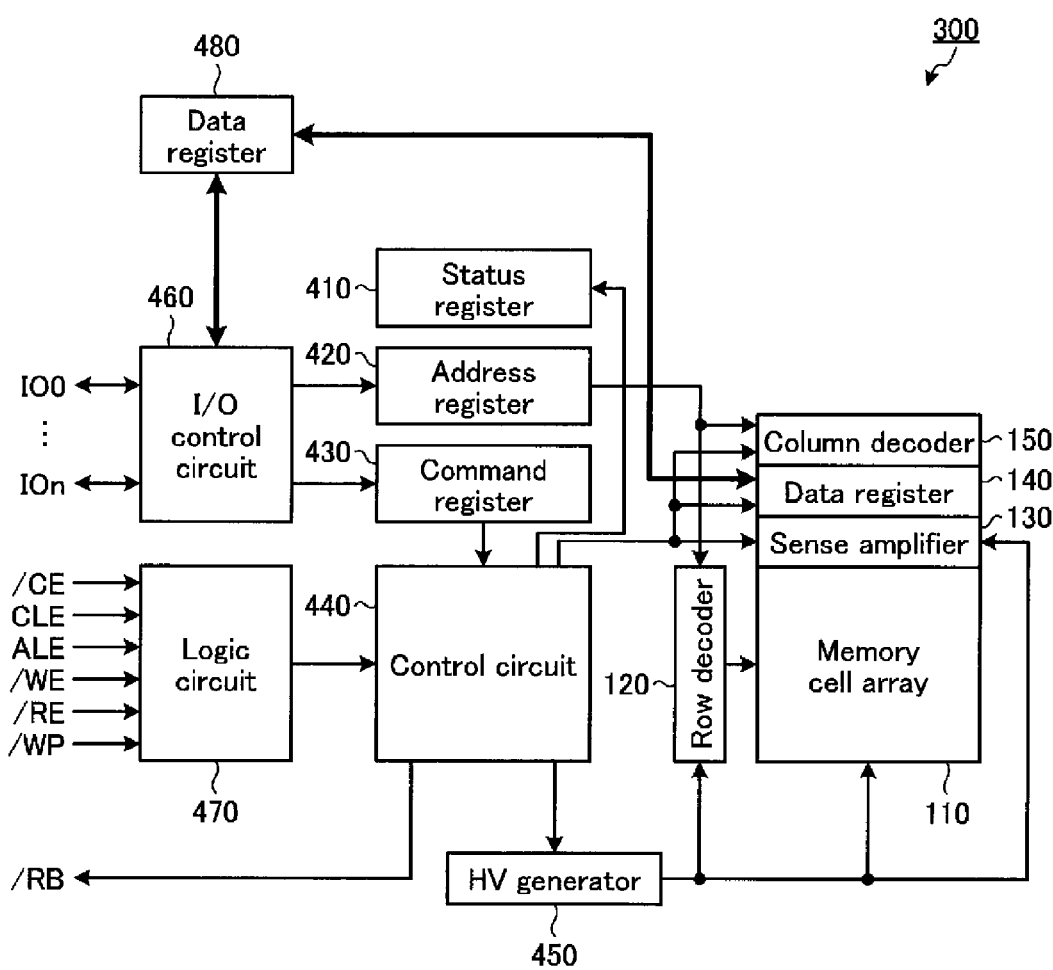
FIG. 8 is a schematic hardware diagram illustrating a memory chip.

FIG. 8 is a schematic hardware diagram illustrating the memory chip 300.

The memory chip 300 includes a memory cell array 110, a row decoder 120, a sense amplifier 130, a data register 140, a column decoder 150, a status register 410, an address register 420, a command register 430, a control circuit 440, a voltage generation circuit 450, an input/output control circuit 460, a logic circuit 470, and a data register 480.

The memory cell array 110 includes a plurality of nonvolatile memory cells associated with rows and columns. The memory cells in the same row are connected to the same word line, and the memory cells in the same column are connected to the same bit line. Reading and writing of data are collectively performed on a plurality of memory cells connected to the same word line. Erasing of data is collectively performed in a unit called a block, which is a group of a plurality of pages.

The row decoder 120 decodes a row address that specifies a row of the memory cell array 110. Then, a word line is selected according to the decoding result, and a voltage required for writing, reading, and erasing data is applied.

When reading data, the sense amplifier 130 senses the data read from the memory cell array 110 and transfers the data to the data register 140. When writing data, the data in the data register 140 is transferred to the memory cell array 110.

The data register 140 temporarily stores one page of write data or read data.

The column decoder 150 decodes a column address that specifies a column of the memory cell array 110. Then, according to the decoding result, the data is transferred to the data register 140 at the time of writing, and the data is read from the data register 140 at the time of reading.

The logic circuit 470 receives the signals /CE, CLE, ALE, /WE, /RE, and /WP from the controller 200.

The input/output control circuit 460 receives signal IO[n:0]. Then, the input/output control circuit 460 determines whether the signal IO corresponds to an address, a command, or data based on ALE and CLE, and stores the determined signal IO in any of the address register 420, the command register 430, and the data register 480.

The status register 410 stores various status information of the memory chip 300.

The control circuit 440 controls the entire memory chip 300 based on the command stored in the command register 430 and various signals input to the logic circuit 470. The control circuit 440 also generates a ready/busy signal /RY/BY and outputs the ready/busy signal /RY/BY to the controller 200.

The voltage generation circuit 450 generates a voltage required for writing, reading, and erasing data based on an instruction from the control circuit 440, and supplies the voltage to the memory cell array 110, the row decoder 120, and the sense amplifier 130.

Next, the operation of the SPI-compliant NAND type flash memory 100 will be described.

Figure 9:
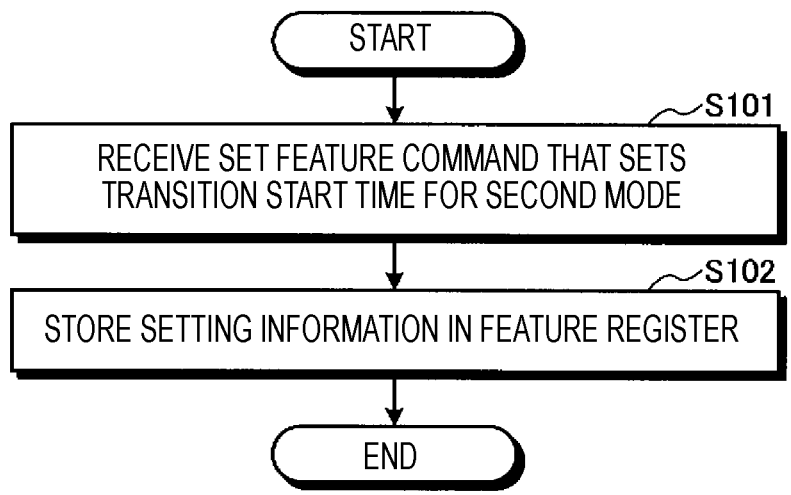
FIG. 9 is a flowchart illustrating a transition start time setting operation to the second mode by the NAND type flash memory.

FIG. 9 is a flowchart of a transition start time setting operation for the second mode by the NAND type flash memory 100. The transition start time setting operation is started when the controller 200 transitions to the normal mode. When the command sequence of the set feature command including the setting information required for the transition start time to the second mode is transmitted from the host 500 to the controller 200, the SPI-compliant NAND type flash memory 100 receives the set feature command from the host 500 (S101). The sequencer circuit 250 stores the setting information sent as data DATA in the command sequence including the set feature command in the feature register 280 (S102). Then, the operation of setting the transition start time to the second mode is ended.

Further, the host 500 may confirm the contents set in the feature register 280 with a get feature command. The host 500 can confirm the current setting information of the transition start time for the second mode by using the get feature command, and then perform the operation illustrated in FIG. 9 if the confirmed current setting information is different from the desired information.

Figure 10:
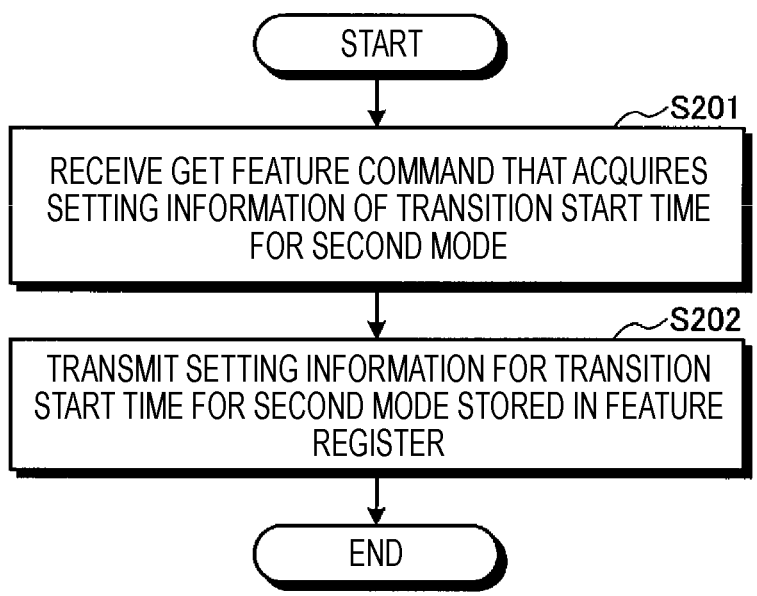
FIG. 10 is a flowchart of an operation of outputting the transition start time for the second mode by the NAND type flash memory.

FIG. 10 is a flowchart of an operation of outputting the second mode transition start time by the NAND type flash memory 100. The operation of outputting the transition start time is executed when the controller 200 is in the normal mode. When the command sequence of the get feature command for confirming the setting information related to the transition start time for the second mode is transmitted from the host 500 to the controller 200, the SPI-compliant NAND type flash memory 100 receives the get feature command from the host 500 (S201). The command sequence of the get feature command includes, as the address information ADDR, the address value indicating an address where the setting information of the transition start time is stored. For example, according to FIG. 5, the address value 10h is transmitted as the address information ADDR. The sequencer circuit 250 sends the setting information of the transition start time, which is stored in the register indicated by the address value sent as the address information ADDR, to the host 500 (S202). Then, the operation of outputting the second mode transition start time is ended.

Figure 11:
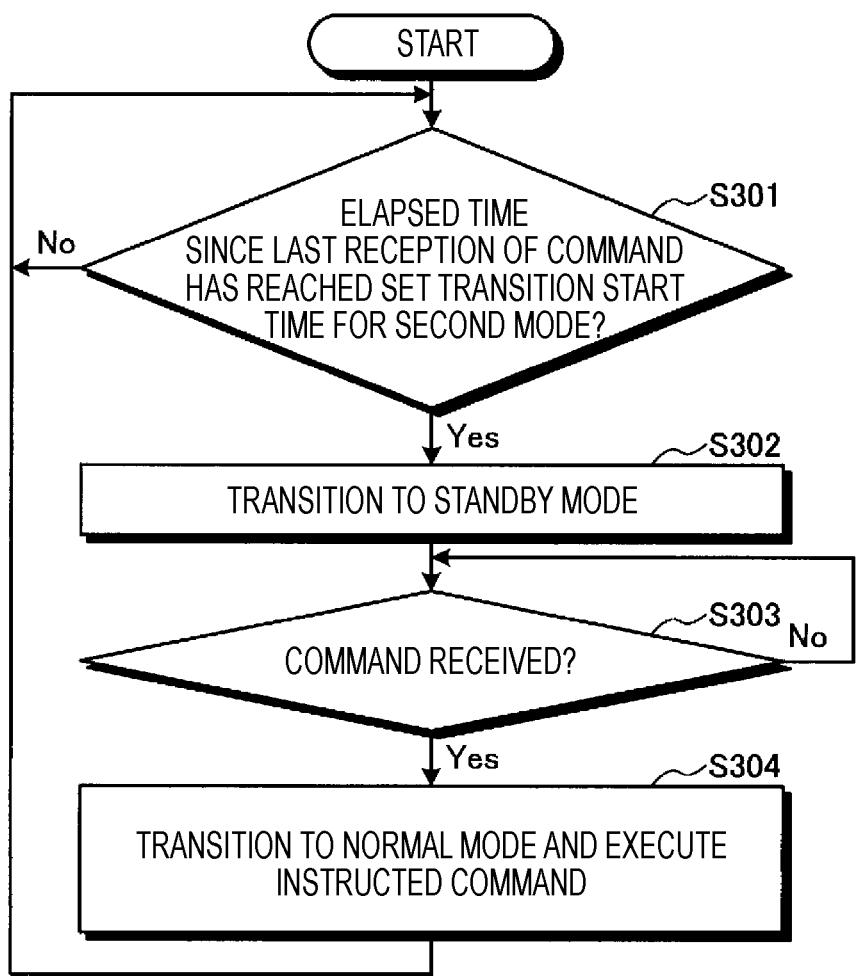
FIG. 11 is a flowchart of a power consumption control operation by an SPI-compliant NAND type flash memory.

FIG. 11 is a flowchart of a power consumption control operation (hereinafter sometimes referred to as the first power consumption control operation) by the SPI-compliant NAND type flash memory 100. The first power consumption control operation is started, for example, when the controller 200 transitions to the normal mode.

In the normal mode, the counter circuit 290 measures the time elapsed since the last command is received. The sequencer circuit 250 determines whether the elapsed time has reached the transition start time for the second mode as set by the set feature command (S301). When it is determined that the elapsed time has not yet reached the set transition start time (S301: No), the sequencer circuit 250 executes the process of S301 again.

When it is determined that the elapsed time has reached the set transition start time (S301: Yes), the sequencer circuit 250 changes the operation mode of the controller 200 from the normal mode to the standby mode (S302). That is, the sequencer circuit 250 suspends the operations of one or more predetermined circuits.

In the standby mode, the SPI-compliant NAND type flash memory 100 waits for a command from the host 500 (S303: No). When the SPI-compliant NAND type flash memory 100 receives a command from the host 500 (S303: Yes), the sequencer circuit 250 changes the operation mode of the controller 200 from the standby mode to the normal mode, and then the controller 200 executes the instructed command (S304). Then, the process returns to S301.

As described above, the controller 200 can set the information of the transition start time for the second mode, which has been received from the host 500. Thus, when the elapsed time since the last reception of a command from the host 500 reaches the set transition start time, the normal mode is switched to the standby mode.

Therefore, the manufacturer of the memory system is relieved of the burden of using only fixed settings for each customer who incorporates the memory system into the device. In addition, the device to which the memory system is incorporated can flexibly change the length of time for transition to the standby mode. That is, it is possible to implement a memory system that is more convenient than that of the related art.

In the above, the controller 200 has been described as receiving the setting information for the second mode transition start time together with the set feature command. The method of setting the transition start time to the second mode is not limited to a method using the set feature command. For example, when a dedicated command for setting the transition start time for the second mode is provided as a command CMD, and such a command is sent, the setting information regarding the transition start time for the second mode may be sent as the data DATA.

Further, in the above description, the setting information of the transition start time is stored in the volatile feature register 280. The area in which the setting information of the transition start time is stored is not limited to the feature register 280. The setting information of the transition start time may be stored in a non-volatile memory. For example, the setting information of the transition start time may be sent to the memory chip 300 and stored in the memory cell array 110.

Second Embodiment

According to a second embodiment, the SPI-compliant NAND type flash memory 100 is configured to execute, in addition to the features of the first embodiment, a dedicated command for instructing an immediate transition from the normal mode to the standby mode (referred to as a standby entry command) and a dedicated command for instructing an immediate transition from the standby mode to the normal mode (referred to as a standby exit command). As a result, the host 500 can control the operation mode of the SPI-compliant NAND type flash memory 100 more flexibly.

In addition, the same elements are denoted by the same reference numerals, and the descriptions thereof will be appropriately omitted below.

In the description of the command sequence illustrated in FIG. 3, for the standby entry command, a value, corresponding to the standby entry command, is sent as the command CMD. For example, the address information ADDR and the data DATA are not sent.

For the standby exit command, a value, corresponding to the standby exit command, is sent as the command CMD. For example, the address information ADDR and the data DATA are not sent.

Figure 12:
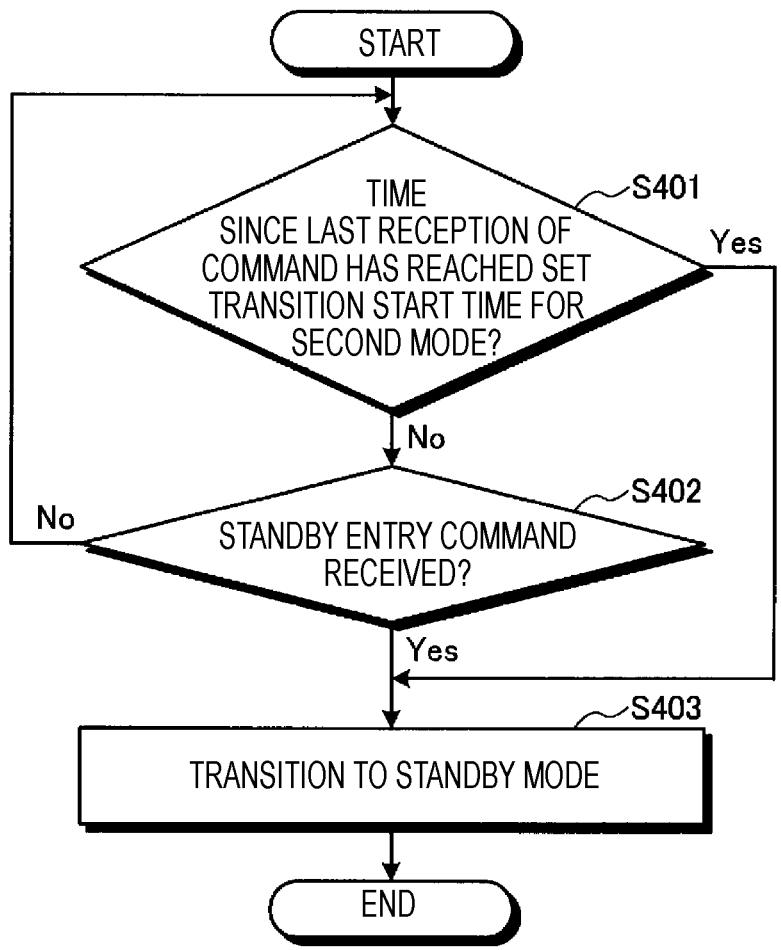
FIG. 12 is a flowchart of an operation at the time of transition from a normal mode to a standby mode in a power consumption control operation by an SPI-compliant NAND type flash memory according to a second embodiment.

FIG. 12 is a flowchart of an operation at the time of transition from a normal mode to a standby mode in a power consumption control operation (hereinafter sometimes referred to as the second power consumption control operation) by the SPI-compliant NAND type flash memory 100. The operation illustrated in FIG. 12 is started, for example, when the controller 200 is changed to the normal mode.

Similar to the process of S301, the sequencer circuit 250 determines whether the elapsed time has reached the transition start time for the second mode that has been set using the set feature command (S401). If the elapsed time has not reached the transition start time (S401: No) but the SPI-compliant NAND type flash memory 100 receives the standby entry command from the host 500 (S402: Yes), the sequencer circuit 250 changes the operation mode from the normal mode to the standby mode (S403). That is, the sequencer circuit 250 suspends the operations of one or more predetermined circuits.

When it is determined that the elapsed time has not reached the transition start time (S401: No) and the SPI-compliant NAND type flash memory 100 has not received the standby entry command from the host 500 (S402: No), the control proceeds to S401. When it is determined that the elapsed time has reached the transition start time (S401: Yes), the process of S402 is skipped, and the control proceeds to S403.

Figure 13:
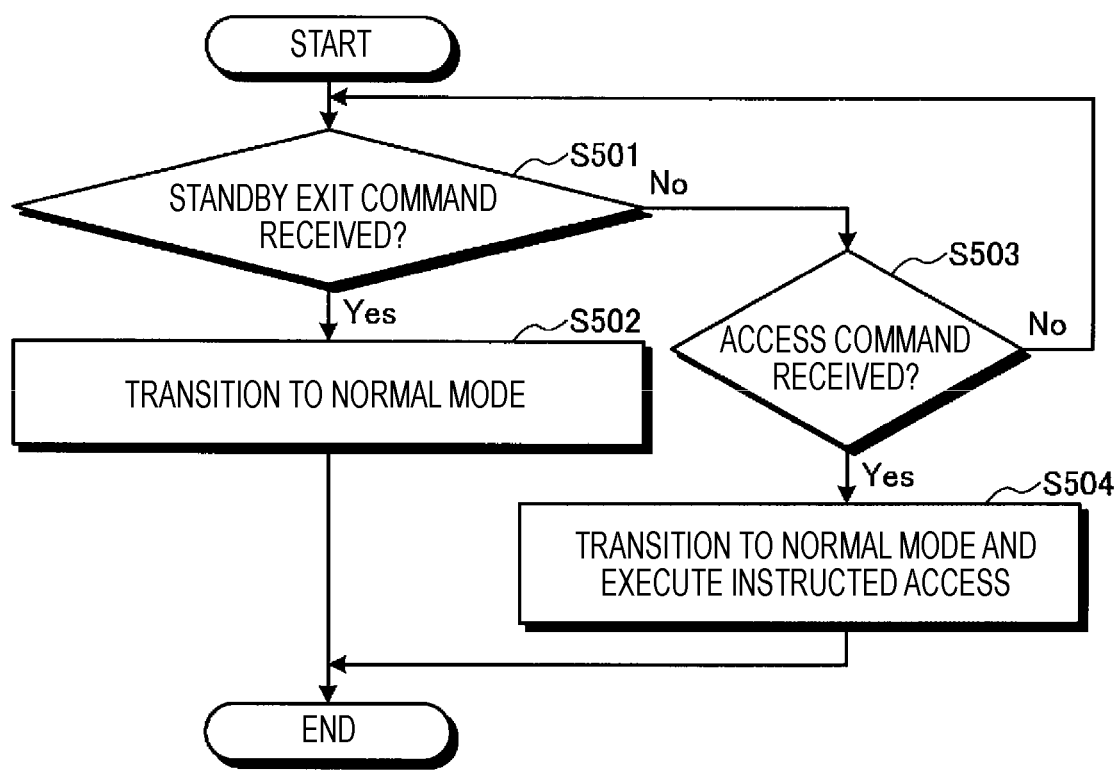
FIG. 13 is a flowchart of an operation at the time of transition from the standby mode to the normal mode in the power consumption control operation by the SPI-compliant NAND type flash memory.

FIG. 13 is a flowchart of an operation at the time of transition from the standby mode to the normal mode in the second power consumption control operation by the SPI-compliant NAND type flash memory 100. The operation illustrated FIG. 13 is started, for example, when the controller 200 is changed to the standby mode.

In the standby mode, when the SPI-compliant NAND type flash memory 100 receives the standby exit command from the host 500 (S501: Yes), the sequencer circuit 250 changes the operation mode from the standby mode to the normal mode (S502). Then, the operation when transitioning from the standby mode to the normal mode is ended.

In the standby mode, when the SPI-compliant NAND type flash memory 100 does not receive the standby exit command from the host 500 (S501: No) and receives the access command (S503: Yes), the sequencer circuit 250 changes the operation mode from the standby mode to the normal mode, and then the controller 200 executes the memory access instructed by the access command (S504). Then, the operation when transitioning from the standby mode to the normal mode is ended.

In the standby mode, when the SPI-compliant NAND type flash memory 100 does not receive the access command from the host 500 (S503: No), the control proceeds to S501.

Thus, the controller 200 transitions to the standby mode in response to the reception of the standby entry command. Since the host 500 can directly instruct the controller 200 to transition to the standby mode with a dedicated command, the degree of freedom in power consumption control is improved.

Further, the controller 200 transitions from the standby mode to the normal mode when receiving the standby exit command.

Since the host 500 can directly instruct the controller 200 to return to the normal mode by a dedicated command, the degree of freedom of power consumption control is improved, and the transition time from the standby mode to the normal mode at the time of receiving an access command from the host 500 thereafter can be reduced to efficiently execute the operation of the SPI-compliant NAND type flash memory 100.

For example, the host 500 transmits the standby exit command before transmitting the access command when the timing of executing the access command in the standby mode is known in advance. As a result, delay in response can be reduced and the access command can be executed by the SPI-compliant NAND type flash memory 100.

Third Embodiment

According to a third embodiment, a dedicated command is used to instruct execution of access and transition to the standby mode with one command. According to the example of FIG. 3, a value corresponding to a command instructing both an execution of access and a transition to the standby mode is sent as the command CMD. The command CMD of this type is referred to as an access+standby entry command. The access instructed by the access+standby entry command is a data read, a data write, and/or a data erase.

Upon receiving the access+standby entry command, the controller 200 executes the instructed access operation, and then, when the execution of the access is completed, the controller 200 immediately transitions to the standby entry command without waiting for another command.

In the third embodiment, the transition start time for the second mode can be set, for example, by the same method as in the first embodiment.

Figure 14:
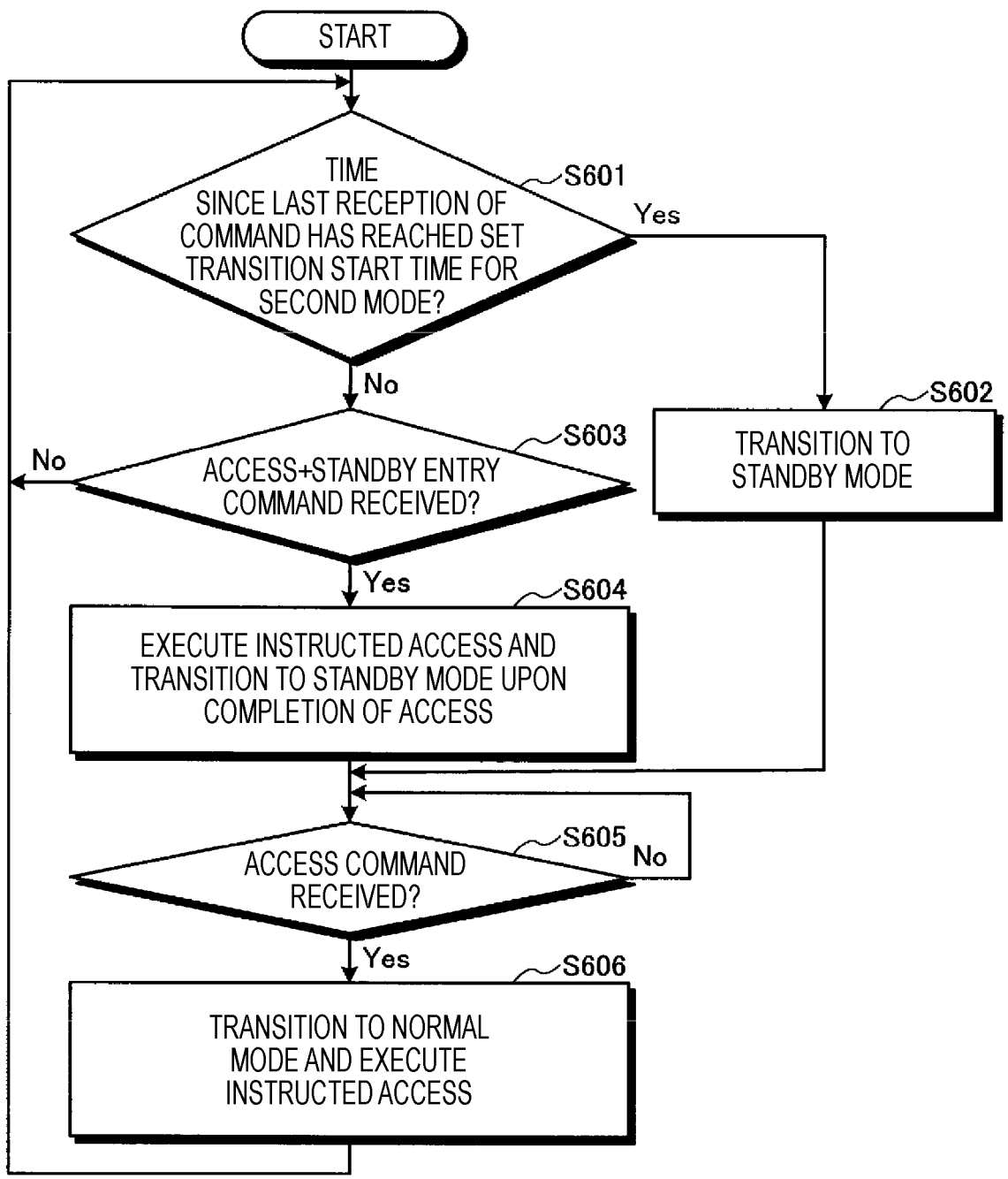
FIG. 14 is a flowchart of power consumption control of an SPI-compliant NAND type flash memory according to a third embodiment.

FIG. 14 is a flowchart of power consumption control of the SPI-compliant NAND type flash memory 100 according to the third embodiment. At the start of the series of operations illustrated FIG. 14, the SPI-compliant NAND type flash memory 100 is assumed to be in the normal mode.

Similar to the process of S201, the sequencer circuit 250 determines whether the elapsed time has reached the transition start time, which has been set using the set feature command (S601). When it is determined that the elapsed time has reached the set transition start time for the second mode (S601: Yes), the sequencer circuit 250 changes the operation mode from the normal mode to the standby mode (S602).

When it is determined that the elapsed time has not reached the transition start time for the second mode (as set by using the set feature command) (S601: No), but the SPI-compliant NAND type flash memory 100 receives the access+standby entry command from the host 500 (S603: Yes), the controller 200 executes the instructed access, and when the access is completed, the sequencer circuit 250 transitions the operation mode from the normal mode to the standby mode (S604).

In the standby mode, the SPI-compliant NAND type flash memory 100 waits for an access command from the host 500 (S605: No). When the SPI-compliant NAND type flash memory 100 receives an access command from the host 500 (S605: Yes), the sequencer circuit 250 changes the operation mode from the standby mode to the normal mode, and then the controller 200 executes the instructed access according to the access command (S606). Then, the control returns to S601.

Thus, in the standby mode, when the controller 200 receives an access+standby entry command instructing both access and transition to the standby mode, the controller 200 executes the instructed access and then transitions to the standby mode in response to the completion of the access.

Therefore, the host 500 does not need to wait for the completion of access before transmitting a standby entry command. In addition, after executing the access, the SPI-compliant NAND type flash memory 100 can transition to the standby mode without waiting for the set transition start time for the second mode to elapse. Therefore, it is possible to reduce power consumption in the SPI-compliant NAND type flash memory 100.

Here, descriptions have been made of the case where the third embodiment is used in combination with the first embodiment. In other examples, the third embodiment may be combined with the second embodiment.

As described above, according to the first to third embodiments, the controller 200 receives the setting information for the transition start time of the second mode from the host 500, and transitions from the normal mode to the standby mode when the elapsed time since the last command reception reaches the set transition start time.

Therefore, the convenience of the SPI-compliant NAND type flash memory 100 is improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
a non-volatile semiconductor memory; and
a controller connected to the non-volatile semiconductor memory via a memory interface circuit, including a register, and configured to:
control access of the non-volatile semiconductor memory according to commands from a host device,
upon receipt of a first command specifying an address of the register and a mode transition time from the host device, store data indicating the mode transition time at the specified address of the register, wherein the address specified by the first command is one of a plurality of predetermined addresses at which two bit data indicating one of four predetermined mode transition times is stored, one of the four mode transition times being at least ten times of another smaller mode transition time,
when a time since any command has been received from the host device reaches the mode transition time indicated by the data stored in the register, transition from a first operating mode to a second operating mode in which power supply is suspended to the memory interface circuit, and
maintain the second operating mode until a second command is received from the host device.

2. The memory system according to claim 1, wherein the second command is a read command to read data from the non-volatile semiconductor memory or a write command to write data to the non-volatile semiconductor memory.

3. The memory system according to claim 1, wherein the second command is a dedicated command for instructing a transition to the first operating mode from the second operating mode.

4. The memory system according to claim 1, wherein the controller is further configured to, upon receipt of a third command from the host device, perform an access operation on the non-volatile semiconductor memory according to an access instruction in the third command and then transition to the second operating mode immediately after completion of the access operation.

5. The memory system according to claim 1, wherein the first command is a set feature command that conforms to a serial peripheral interface (SPI) standard.

6. The memory system according to claim 5, wherein the predetermined addresses are feature table addresses of a feature register.

7. The memory system according to claim 1, further comprising:
a first interface conforming to a serial peripheral interface (SPI) standard by which the first and second commands are received from the host device.

8. The memory system according to claim 1, wherein the controller is further configured to, upon receipt of a third command from the host device, prohibit switching to the second operating mode from the first operating mode.

9. An information processing apparatus, comprising:
a host device;
a non-volatile semiconductor memory; and
a memory controller connected to the non-volatile semiconductor memory via a memory interface circuit, including a register, and configured to:
control access of the non-volatile semiconductor memory by the host device,
upon receipt of a first command specifying an address of the register and a mode transition time from the host device, store data indicating the mode transition time at the specified address of the register, wherein the address specified by the first command is one of a plurality of predetermined addresses at which two bit data indicating one of four predetermined mode transition times is stored, one of the four mode transition times being at least ten times of another smaller mode transition time,
when a time since any command has been received from the host device reaches the mode transition time indicated by the data stored in the register, transition from a first operating mode to a second operating mode in which power supply is suspended to the memory interface circuit, and
maintain the second operating mode until a second command is received from the host device.

10. The information processing apparatus according to claim 9, wherein the second command is a read command to read data from the non-volatile semiconductor memory or a write command to write data to the non-volatile semiconductor memory.

11. The information processing apparatus according to claim 9, the second command is a dedicated command for instructing a transition to the first operating mode from the second operating mode.

12. The information processing apparatus according to claim 9, wherein the memory controller is further configured to, upon receipt of a third command from the host device, perform an access operation on the non-volatile semiconductor memory according to an access instruction in the third command and then transition to the second operating mode immediately after completion of the access operation.

13. The information processing apparatus according to claim 9, wherein the first command is a set feature command that conforms to a serial peripheral interface (SPI) standard.

14. The information processing apparatus according to claim 9, wherein the memory controller includes a first interface conforming to a serial peripheral interface (SPI) standard by which the first and second commands are received from the host device.

15. The information processing apparatus according to claim 9, further comprising:
a battery, wherein the memory controller is further configured to control power supply from the battery to the predetermined circuit.

* * * * *